UNITED STATES PATENT OFFICE.

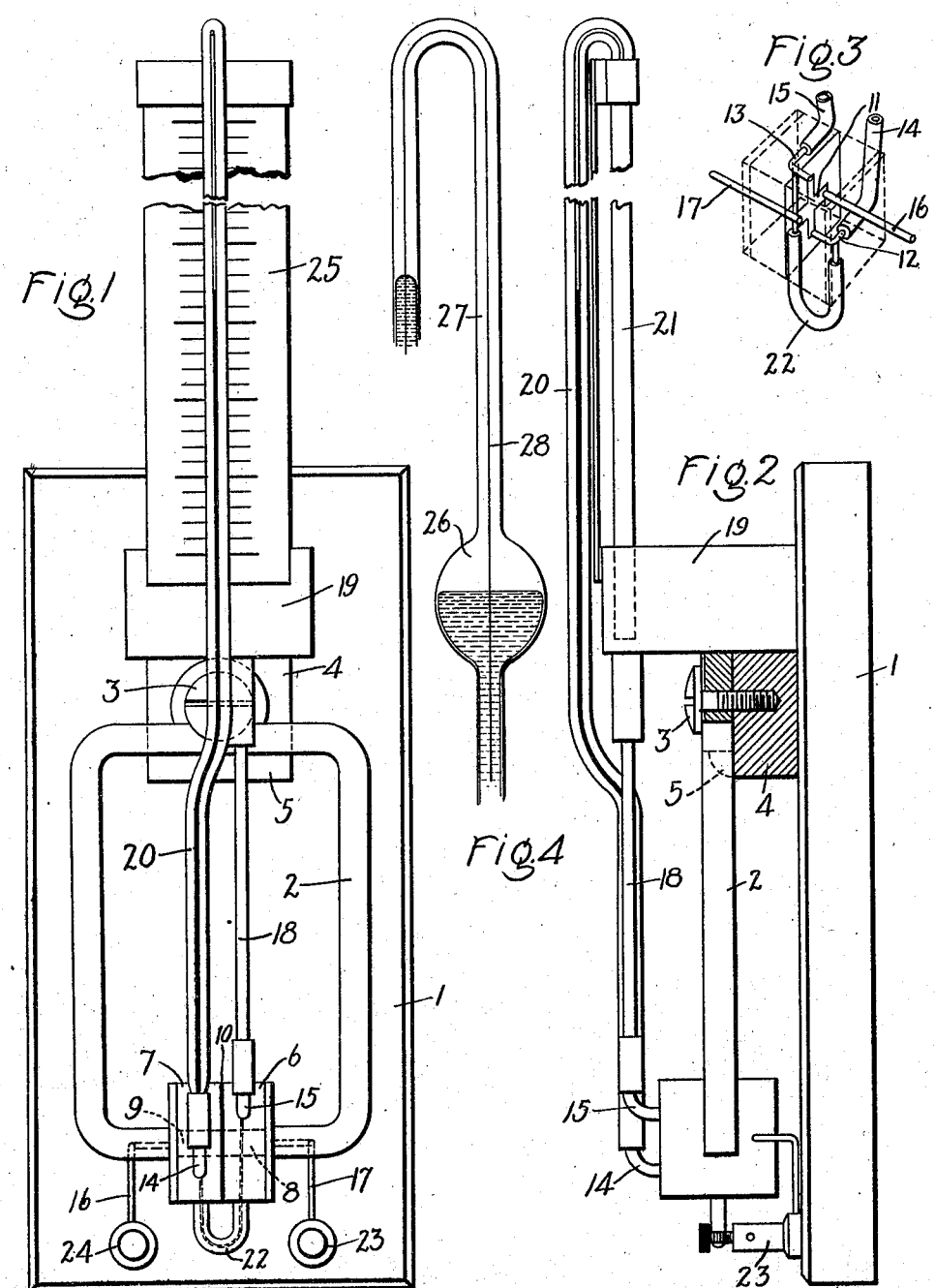

FRANK HOLDEN, OF LONDON, ENGLAND, ASSIGNOR TO GENERAL ELECTRIC COMPANY, A CORPORATION OF NEW YORK.

ELECTRIC MEASURING INSTRUMENT.

No. 853,790.　　　Specification of Letters Patent.　　　Patented May 14, 1907.

Application filed December 14, 1906. Serial No. 347,829.

*To all whom it may concern:*

Be it known that I, FRANK HOLDEN, a citizen of the United States, residing at London, England, have invented certain new and useful Improvements in Electric Measuring Instruments, of which the following is a specification.

My invention relates to electrical measuring instruments and particularly to that type of instrument in which the current to be measured (or a certain portion thereof) passes through a conducting liquid contained in a chamber located in a magnetic field, thereby producing a tendency for the liquid to flow through the chamber, a reservoir being connected with one side of it and a gage tube to the opposite side of the chamber. The height to which the liquid rises in the gage tube is proportional to the current passing through the instrument, and an indication of the current value may thus be obtained from a scale located adjacent the tube.

An integrating meter operating on this principle is covered by my co-pending application, Serial No. 297,600, filed Jan. 24th, 1906.

In indicating instruments operating on the principle above described, there is no continuous movement of the liquid conductor. That is, there is no circulation of the liquid through a closed path as there is in the integrating meter. The current, therefore, is passing constantly through nearly the same mass of liquid and there is little opportunity for the heat generated therein to be dispelled. Heating of the liquid to any great extent is of course objectionable and the current capacity of indicating instruments of this kind has been limited for this reason. The chief object of my invention is to overcome this difficulty and for this purpose I construct the apparatus so that a continuous circulation of the liquid takes place. This end is attained by the use of a by-pass of small cross section between the tubes which carry the liquid to and from the chamber located in the magnetic field.

My invention further consists in the improved construction of apparatus hereafter described. The details of my invention will be understood from the following description when taken in connection with the accompanying drawings in which Figure 1 is a front elevation of an instrument embodying my invention; Fig. 2 is a side elevation thereof; Fig. 3 is a perspective view in a somewhat diagrammatic form of the chamber which is located in the magnetic field and the parts adjacent thereto; and Fig. 4 is an elevation of a modified form of tube and reservoir.

The various parts of the instrument may be supported in any suitable manner, as by being attached to a back 1. A magnet 2 may be held as by the screw 3 and the block 4 having the projection 5 upon which the magnet is supported. The ends of this magnet are embedded in a pair of rectangular blocks 6 and 7 made of insulating material, such as slate. These blocks have embedded therein pole pieces 8 and 9; these pole pieces being so arranged that when the blocks are superposed the pole faces confront each other. These pole pieces are attached to the ends of the magnet, and being of reduced cross section a very intense magnetic field is set up between the adjacent pole faces.

In order to form the space for the conducting liquid, this being usually mercury, a sheet 10 of mica or other suitable material, in the center of which is cut an opening or channel 11 of cruciform shape, is interposed between the blocks 6 and 7. The mica sheet is so located that the central portion of the cruciform opening is wholly within the area of the pole faces, and the limbs of said opening are parallel to the sides of the blocks. The ends of two opposite limbs are connected by openings 12 and 13 with the tubes 14 and 15 which are sealed into the sides of the blocks. The ends of the other two limbs of the cruciform opening in the mica sheet have extending into them conductors 16 and 17 which are sealed into the blocks. This construction is clearly shown in Fig. 3 and is the same as that described in my co-pending application above referred to.

The tube 15 is connected by means of the tube 18 with the reservoir 19. The tube 14 has connected thereto the vertical gage tube 20 which is bent over at the top and has an extension 21 extending downwardly into the reservoir 19 for a purpose hereafter explained.

Connected with the passages 12 and 13 is the tube 22 which is of very small bore as compared with the bore of the tubes 14 and 15. This tube 22 serves as a by-pass around the chamber in the mica sheet between the slate blocks and permits enough circulation of the mercury to keep the same cool without, to any appreciable extent, affecting the level to which the mercury is caused to rise in the tube 20.

The conductors 16 and 17 are connected with the binding posts 23 and 24. A scale 25 supported adjacent the tube 20 indicates the current which corresponds to the height of the mercury in the tube.

The operation of the instrument will be understood from the foregoing description. When current is passed through the instrument a pumping action is set up in the chamber within the blocks and the mercury is caused to rise in the gage tube being at the same time drawn from the reservoir. The mercury continues to rise in the gage tube 20 until the hydrostatic pressure, due to the difference of level of the mercury in the reservoir and the mercury in the gage tube, balances the pressure exerted by the pumping action in the cruciform chamber. By having the upper end of the gage tube bent over, and projecting into the reservoir, any mercury that may be driven up to the top of the tube by a sudden great increase of current will flow over into the reservoir.

The instrument may be adapted for use as a maximum demand indicator by providing the tube 20 with a check valve or with a non-return float which will be driven up in the tube as the mercury rises. Fig. 4 shows a modified form of reservoir which consists of a bulb 26 blown in a part of the tube 27 which serves as the gage tube of the instrument. In order to prevent air bubbles from being caught in the mercury a wire or glass filament 28 may be placed in the tube 27 with its ends dipping into the mercury in the reservoir and the mercury in the gage tube. With this construction the apparatus may be hermetically sealed or, if desired, may be exhausted of air. Instead of the permanent magnet 2 an electro-magnet may of course be used. Other modifications will occur to those skilled in the art, and I wish it understood that it is my intention to include all such as being within the scope of my invention as defined in the claims appended hereto.

My device may be used as an ammeter by connecting it across a low resistance shunt interposed in the circuit, the current in which it is to be measured or it may be used as a voltmeter by arranging a resistance in series with it and connecting to the points in the circuit between which the difference of potential is to be measured.

What I claim as new and desire to secure by Letters Patent of the United States, is:—

1. An electrical measuring instrument comprising means for producing a magnetic field, a chamber containing a liquid located in said field, a supply tube and a gage tube connected to said chamber, conductors entering said chamber, and a by-pass around said chamber for permitting circulation of said liquid.

2. An electrical measuring instrument comprising means for producing a magnetic field, a chamber containing a conducting liquid located in said field, a supply tube connected to one side of said chamber and a gage tube connected to the opposite side, conductors entering said chamber and arranged so that a current passing from one to the other through the liquid will traverse the magnetic field, and a by-pass around said chamber for permitting circulation of said liquid.

3. An electrical measuring instrument comprising means for producing a magnetic field, a chamber containing a liquid located in said field, a reservoir, a tube connecting the reservoir and chamber, a gage tube rising from said chamber, conductors entering said chamber, and a by-pass around said chamber for permitting circulation of said liquid.

4. An electrical measuring instrument comprising means for producing a magnetic field, a narrow chamber containing mercury located in said field, a reservoir, a tube connecting the reservoir and chamber, a gage tube rising from said chamber, conductors entering said chamber, and a by-pass of small bore around said chamber for permitting circulation of said mercury.

5. An electrical measuring instrument comprising means for producing a magnetic field, a chamber containing mercury located in said field, a reservoir, a tube connecting the bottom of said reservoir and the chamber, a gage tube rising from said chamber and connected to the top of the reservoir, conductors entering said chamber, and a by-pass around said chamber for permitting circulation of said liquid.

6. An electrical measuring instrument comprising blocks of insulating material, a sheet of non-conducting material having a channel therein located between said blocks, a magnet having its poles extending through said blocks close to said channel, conductors extending to said channel, a supply tube connected to one side of said channel, a gage tube connected to the other side of said channel, and a by-pass around said channel for permitting circulation of the mercury contained in the instrument.

In witness whereof, I have hereunto set my hand this 1st day of December, 1906.

FRANK HOLDEN.

Witnesses:
H. D. JAMESON,
F. D. RAND.